(12) United States Patent
Dean et al.

(10) Patent No.: US 7,006,985 B1
(45) Date of Patent: Feb. 28, 2006

(54) CONFIGURATION OF COMPUTER SYSTEMS BASED UPON PURCHASERS COMPONENT NEEDS AS DETERMINED FROM PURCHASER DATA ENTRIES CORRELATED WITH A SET OF SELLER BUSINESS RULES TO OPTIMIZE QUANTITIES OF EACH COMPONENT SOLD

(75) Inventors: Jeffrey Randell Dean, Austin, TX (US); Jeffrey Langdon Howard, Austin, TX (US); Ingrid Milagros Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,615

(22) Filed: Mar. 31, 1999

(51) Int. Cl.
G06F 17/60 (2006.01)

(52) U.S. Cl. .......................................... 705/26; 705/28
(58) Field of Classification Search ................... 705/26, 705/27, 28, 8, 29; 713/1
See application file for complete search history.

(56) References Cited

U.S. PATENT DOCUMENTS

| | | | | |
|---|---|---|---|---|
| 5,515,524 A | * | 5/1996 | Lynch et al. ................... | 703/13 |
| 5,668,995 A | * | 9/1997 | Bhat .......................... | 709/104 |
| 5,963,919 A | * | 10/1999 | Brinkley et al. ............... | 705/28 |
| 6,052,667 A | * | 4/2000 | Walker et al. ................. | 705/15 |
| 6,167,383 A | * | 12/2000 | Henson ........................ | 705/26 |
| 6,192,470 B1 | * | 2/2001 | Kelley et al. .................. | 713/1 |
| 6,336,101 B1 | * | 1/2002 | Dean et al. ................... | 705/29 |

FOREIGN PATENT DOCUMENTS

EP 0 899 672 A2 * 3/1999

OTHER PUBLICATIONS

Allyson Bates, "The build–to–order dilemma", Macworld, v15n5, May 1998.*

Online purchase of computer system at "www.dell.com".*

"Dell Relaunches E–Commerce Site with New Features", May 21, 1998, Dell Computer Corp, Round Rock, Texas.*

"Rebates Baiting The Channel—Vendors hook distributors", Jun. 16, 1997, Computer Reseller News, p 01.*

* cited by examiner

*Primary Examiner*—Jeffrey A. Smith
*Assistant Examiner*—Marissa Thein
(74) *Attorney, Agent, or Firm*—Mark S. Walker; Jerry Kraft; Leslie Van Leuwen

(57) ABSTRACT

The seller of computer components who has developed the process for configuring computer systems or networks provides a configuration process comprising a prompting system or computer purchasers to make a sequence of interactive data entries, each of said entries relative to the data processing needs of the purchaser of one of said computer systems, allocating said computer components to said computer systems based upon said user entries which are indicative of the system needs solution of that purchaser, and tracking the quantities of said computer components thereby allocated to computer systems sold by said seller to said purchasers. In addition, the invention includes means for applying a set of seller business rules to the tracked quantities of each of said computer components to produce a set of optimized quantities for each of said computer components based on the seller's business needs and means for offering to selected ones of said purchasers modifications in the quantities of selected ones of said allocated components to thereby reconcile said purchasers' system needs solutions with said optimized quantities of said components based upon the seller's business needs. Through the purchasers' cooperation in permitting the seller to make such a dynamic reconciliation of the purchasers' system solution needs with the seller's business needs, the seller is able, through the optimization of profits, to recoup the costs of developing and maintaining the processes for configuring computer systems.

15 Claims, 11 Drawing Sheets

FIG.7

```
User Profile                                            ─ 71
   Full Name  [        ]      Group  [            ]
   User Name  [        ]      Job    [            ]
                                          ╲
                                           72

Hours / Day of use   [  ]
   of computer             ╲─ 73
   Hours of Graphics use [ ]
                          ╲─ 74
```

CONFIGURATION OF COMPUTER SYSTEMS BASED UPON PURCHASERS COMPONENT NEEDS AS DETERMINED FROM PURCHASER DATA ENTRIES CORRELATED WITH A SET OF SELLER BUSINESS RULES TO OPTIMIZE QUANTITIES OF EACH COMPONENT SOLD

CROSS-REFERENCE TO RELATED PATENT APPLICATIONS

The following patent applications, which are assigned to the same assignee as the present invention, cover subject matter related to the subject matter of the present patent application Ser. No. 09/159,954, filed Sep. 24, 1998, now U.S. Pat. No. 6,336,101, entitled Tracking of Computer Components Allocated During Configuration of Computer Systems and Networks by a Simplified User Friendly Configuration Process, to Dean, Howard and Rodriguez; and, Ser. No. 09/282,616, filed Mar. 31, 1999 (pending), entitled Configuration of Computer Systems Based upon Purchaser Component Needs as Determined from Purchaser Data Entries and Having a Tiered Structure of Financial Incentive Levels Automatically Provided From Distributer to System Resellers, to Dean, Howard, Neumann and Rodriquez.

TECHNICAL FIELD

The present invention relates to a process and program for the configuration of computer systems and networks provided to purchasers of systems through sellers of computer components, and particularly to a program for reconciling the system needs solutions of the purchasers with the overall business rules of the seller so as to help the business needs of the seller to optimize its quantities of sold computer components.

BACKGROUND OF RELATED ART

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement over the Internet. As a result of these changes, it seems as if virtually all aspects of human productivity in the industrialized world require human/computer interaction. The computer industry has been a force for bringing about great increases in business and industrial productivity. Almost every week seems to bring computer industry advances which promise even further increases in productivity. These advances offer to drive down business and industry costs and increase efficiency, in addition to increasing productivity. In addition, the cost of "computer power" continues to drop as a result of rapid advances in computer related technologies.

Despite all of these advantages there still remains great resistance in all industries and business fields to new computer systems and significant system upgrades, which offer much in productivity increases. This resistance results from past experience, which equates installing new computer systems or significant upgrades in existing systems with large amounts of down time, during which the business, manufacturing facility or individual worker functions are inoperative or operate at diminished levels. When a business or production facility is trying to decide whether to install a new computer system, the concern about down time, the possible loss of business, as well as stress on the workers involved, very often outweighs the cost of the installation in influencing the decision. The concern about business and production delays resulting from installation has become so great that fewer and fewer small businesses are trying to make system and program changes on their own. This concern is even greater when the business is considering the installation of a computer network. While many businesses would likely be much more productive if their computers were interconnected with each other, the thought of a network may be very frightening to many small businesses without much computer experience.

Because of this expanding demand for computer and network installations, many major manufacturers and distributors of computer components, both hardware and software, have been expending great amounts of research and development efforts to develop programming systems and tools to simplify and expedite such computer system and network configuration installation and upgrades. These tools may be used directly by the purchasers of the components who are setting up their own systems and to whom the manufacturer/distributors may sell directly. They also may be used through intermediate providers or resellers in the professional computer service industry which carries out and supports installations and upgrades for the business and industrial sectors. In either the case of direct sales to the purchasers of components for systems or through such professional installers or resellers, distributors who have developed such system configuration programs need to be adequately compensated for their expenditures through the sale of their components used in the systems. Both of the above cross-referenced patent applications offer solutions. In Ser. No. 09/159,954, now U.S. Pat. No. 6,336,101, the distributer or manufacturer of the computer components, which has developed the process for configuring computer systems or networks, provides to the seller or reseller a configuration process comprising a prompting system for computer purchasers to make a sequence of interactive data entries, each of said entries relative to the data processing needs of the purchaser of one of said computer systems, allocating said computer components to said computer systems based upon said user entries, tracking the quantities of said computer components thereby allocated to computer systems sold by said seller to said purchasers during a selected time period, and determining to forego fees due from said seller to said distributer for said process when said quantities of components thereby allocated during said time period exceed a selected level.

Copending cross-referenced patent application Ser. No. 09/282,616 provides the reseller with a hierarchy of related financial incentive levels based upon the sales of the manufacturer or distributer's computer components.

SUMMARY OF THE PRESENT INVENTION

The present invention provides another solution involving reconciling the system needs solutions of the purchasers with the overall business rules of the seller, i.e. the manufacturer/distributor, so as to help the business needs of the seller to optimize its quantities of sold computer components and thereby enhance its profits. In the present invention, the distributor or manufacturer which has developed the process for configuring computer systems or networks and which is the seller of the components still provides a configuration process comprising a prompting system for computer purchasers to make a sequence of interactive data entries, each of said entries relative to the data processing needs of the purchaser of one of said computer systems, allocating said computer components to said computer systems based upon said user entries which are indicative of the system needs solution of that purchaser, and tracking the quantities of said computer components thereby allocated to computer systems sold by said seller to said purchasers. In addition, the invention includes means for applying a set of seller business rules to the tracked quantities of each of said computer components to produce a set of optimized quantities for each of said computer components based on the seller's business needs, and means for offering to selected ones of said purchasers modifications in the quantities of selected ones of said allocated components to thereby reconcile said purchasers' system needs solutions with said optimized quantities of said components based upon the seller's business needs. Through the purchasers' cooperation in permitting the seller to make such a dynamic reconciliation of the purchasers' system solution needs with the seller's business needs, the seller is able, through the optimization of profits, to recoup the costs of developing and maintaining the processes for configuring computer systems.

There is an implementation of the basic invention wherein the means for offering to purchasers modifications in quantities of selected allocated components includes means for enabling the seller to offer to said purchasers financial incentives for accepting said modifications. There is a further implementation, along the same lines, wherein the means for offering to purchasers modifications in quantities of selected allocated components includes means for providing a set of business rules for reconciling said purchasers' system needs with said optimized quantities and means for automatically offering said purchasers financial incentives based upon said rules for reconciling.

The invention also could include means for dynamically modifying said set of seller business rules, as well as means for dynamically modifying said set of business rules for reconciling.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIGS. 3 through 10 are a series of dialog panels prompting users to make some typical illustrative data entries which the process involving the present invention uses to make allocation of computer components;

FIG. 3 is a dialog panel for adding users to the network configuration;

FIG. 4 is an illustrative dialog panel for organizing users according to work groups;

FIG. 5 is an illustrative dialog panel for providing first-in/last-out employee information to provide time for backup and other off-time functions;

FIG. 6 is an illustrative dialog panel for the setting up of data security;

FIG. 7 is an illustrative dialog panel for establishing user profiles;

FIG. 8 is a diagrammatic view of an interactive dialog screen on a purchaser's display station for the entry of data relative to another application;

FIG. 9 is a diagrammatic view of an interactive dialog screen on a purchaser's display station for the entry of data relative to application programs to be installed on purchaser's client computers;

FIG. 10 is a diagrammatic view of an interactive dialog screen on a purchaser's display station for the entry of data relative to an accounting application program to be installed on the purchasers' client computers;

DETAILED DESCRIPTION OF THE PREFERRED EMBODIMENT

Figure 1:
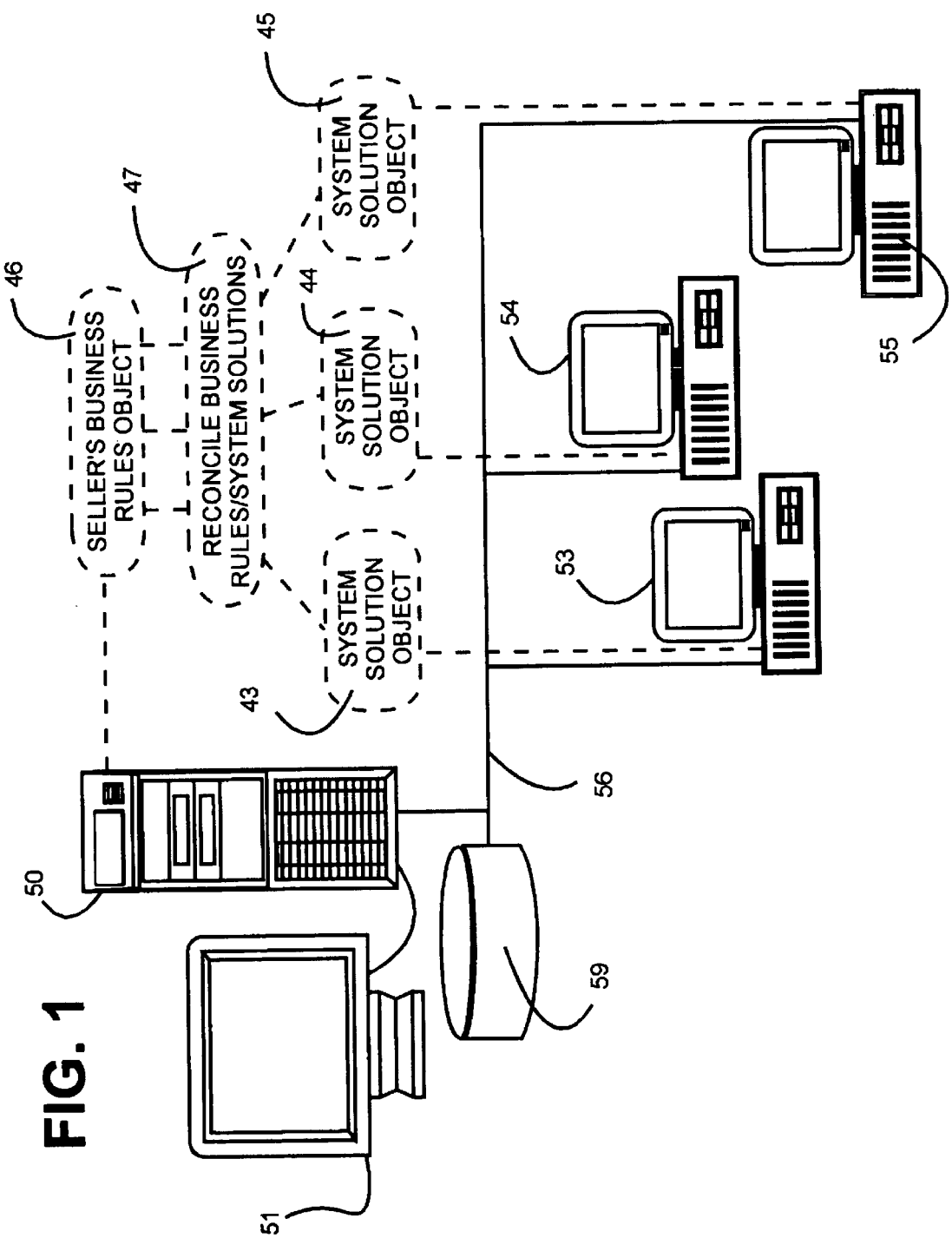
FIG. 1 is a generalized diagrammatic view of a network linking a seller with a plurality of purchaser systems being configured with the various purchasers' system solution objects, the sellers business rules object, the object which reconciles the business rules with system solutions diagrammatically shown in outline.

With reference to FIG. 1 there is shown a representative diagram of a network connecting the seller and his purchasers. The present invention, involving the tracking of the allocated computer components to purchasers according to system solution programs determining purchaser needs, applying the seller's business rules to quantities of allocated components and reconciling differences to optimize seller profitability will be illustrated with respect to this embodiment. The purchasers who will be inputting the data and the sellers are linked to each other through a network 56, which may be a wide area network (WAN) such as the Internet or a local area network (LAN). In the simplified illustrative illustration shown in FIG. 1, assume that the purchasers are inputting information through computer display terminals 53, 54 and 55 in a local network, and the seller is accessing data through server 50 and display terminal 51. The following objects are stored in server 50 and respectively available to all elements in the network: system solution objects 43, 44 and 45 respectively determining and allocating the component needs for the purchasers inputting at computer display terminals 53, 54 and 55; seller's business rules object 46, which functions to modify allocations of computer components to purchasers so as to optimize seller profitability and reconcile business rules/system solutions object 47, which functions to offer modifications in component allocations which optimize seller profitability without significantly affecting purchasers' system solution needs. As will be subsequently described with respect to FIGS. 3 through 10, all configuration entries and settings from the purchasers on terminals 53 through 55 are transmitted to and stored in reseller server 50. With respect to the allocation of software computer components, as will be seen from the subsequent description, all of the allocated software components may be stored in association with server 50, e.g. in its storage facility 59, and then distributed as needed to the network purchasers at purchaser stations 53 through 55. The server 50 will allocate the appropriate software components to the users at the appropriate purchaser terminals.

The programs to be subsequently described which track the allocation of such software components will store the allocation data in storage facility 59. As will be described in the details of server 50 with respect to FIG. 2, the server has access to networks such as the Internet, and additional components needed for any configuration may be accessed over such networks. Even when all of the components are software computer components, e.g. programs used are stored in server 50, the number and types of allocated software programs may, of course, vary since such numbers are measured by the number of times the process will make copies of such software for the multiple users within the purchaser to which such programs are being allocated. The process of the invention tracks the types and quantities of the software programs used and stores this information conveniently in storage facility 59.

The process of the present invention also allocates and tracks hardware components including displays, printers, disk drives and other storage devices, as well as internal computer components. The allocated hardware may be installed into the system being configured from local inventories or the components may be shipped to the reseller for installation. In any case, data on the types and quantities allocated is tracked and stored. The distributer has access to the allocation data stored in association with the reseller on storage facility 59.

With available present day system and programming technology the system solution component allocation functions for each purchaser, the application of the seller's business rules function, as well as the reconciliation function, may most effectively be implemented with existing object oriented technology. The details of how these respective objects function will be subsequently described with respect to FIGS. 11A, 11B and 12. However, by way of background, reference will be made here to appropriate object oriented technology, which may be used to implement such object functions. Actually, all of objects 43 through 47 in FIG. 1 are variations of business rules objects. Accordingly, we will first provide some object oriented technology background and then provide some technology sources on how to form appropriate business rules objects. The computer and communications industries have extensively participated in the development and continual upgrading of object oriented programming systems, such as the Java system. For details and background with respect to object oriented programming systems such as the Java programming system, C++ and others, reference may be made to some typical texts: *Just Java,* 2nd Edition, Peter van der Linden, Sun Microsystems, 1997; *Thinking in Java,* Bruce Eckel, Prentice Hall PTR, 1998; and, *Objects, Components and Frameworks with UML,* Desmond F. D'Sousa et al., Addison-Wesley, 1998. The functions to be described may be especially effectively implemented using the most recent version of Java, Java™ 1.2, which is covered in the text *Java Swing,* Robert Eckstein et al, published by O'Reilly and Associates, California 1998.

With respect to business objects or business rules objects within the object oriented business systems there is a trend towards externalizing business decisions into business rules which are described and manipulated by business experts instead of basic programmers. Business objects are independently developed executables which can be redeployed as self-contained units anywhere in a network and on any platform. Flexible business processes and object modeling tools are evolving that give businesses and information technology (IT) specialists a common environment to define, redefine, model and automate business processes through business objects.

Although the term "business object" has been in widespread use, no formal definition existed until the Object Management Group (OMG), a multicompany organization with the mission of producing standards, took the task of developing a consensus meaning for the term. Business objects are representations of the nature and behavior of real world things or concepts in terms that are meaningful to the business. Customers, products, orders, employees, trades, financial instruments, shipping containers and vehicles are all examples of real world concepts or things that can be represented by business objects. Business objects add value over other representations by providing a way of managing complexity, giving a higher level perspective and packaging the essential characteristics of business concepts more completely. We can think of business objects as actors, role players or surrogates for the real world things or concepts that they represent. The efforts of the OMG in this direction are described in greater detail in Chapter 10, pp. 147–153, in the text entitled, *Object Technology in Application Development,* Daniel Tkach et al., Addison-Wesley Publishing Co., 1996.

Business objects allow a seller or purchaser to communicate, model, design, implement, distribute, evolve and market the software technology that enables them to run their business. The characteristics of business objects include communication, modeling, design, implementation and distribution. Communication is provided through business objects which supply common terms and ideas at a level of detail which can be shared among business and technical people to articulate and understand the business in business terms. Modeling is achieved because business objects have certain characteristics and behaviors which enable them to be used naturally in modeling business processes, and the relationships and interactions between business concepts. The design characteristic is possible because business objects represent real world things and concepts which enable the design effort to be divided into manageable chunks. Business objects meet the implementation characteristic because they have late and flexible binding and well defined interfaces so that they can be implemented independently. Finally, distribution is possible because business objects are independent so that they can be distributed as self-contained units to platforms with a suitably installed infrastructure.

Many business problems are analyzed, designed and documented using an object oriented modeling notation. The notations in the popular methodologies do a good job of capturing the business operations between business objects. Using one of these modeling notations, developers build interface object models, local business object models, corporate business object models and storage object models.

Object models are used to describe objects in a system and their relationships. It describes the system., classes, attributes, operations and relationships in and among the object entities in the system. Each object oriented entity becomes a class in a class diagram which depicts a graph whose nodes denote object classes and whose arcs denote relationships between classes. In the object model, object identifiers, their attributes and their methods are described. The object model provides a framework at which the dynamic and the functional models are represented. For a comprehensive description on building business objects reference may be made to the above-mentioned text, *Ojects, Components and Frameworks with UML,* Desmond F. D'Sousa et al., Chapter 14, pp. 543–580, entitled, "How to Build a Business Model", and to pp. 517–532, of the same text on the details of some typical processes for creating business objects.

Figure 2:
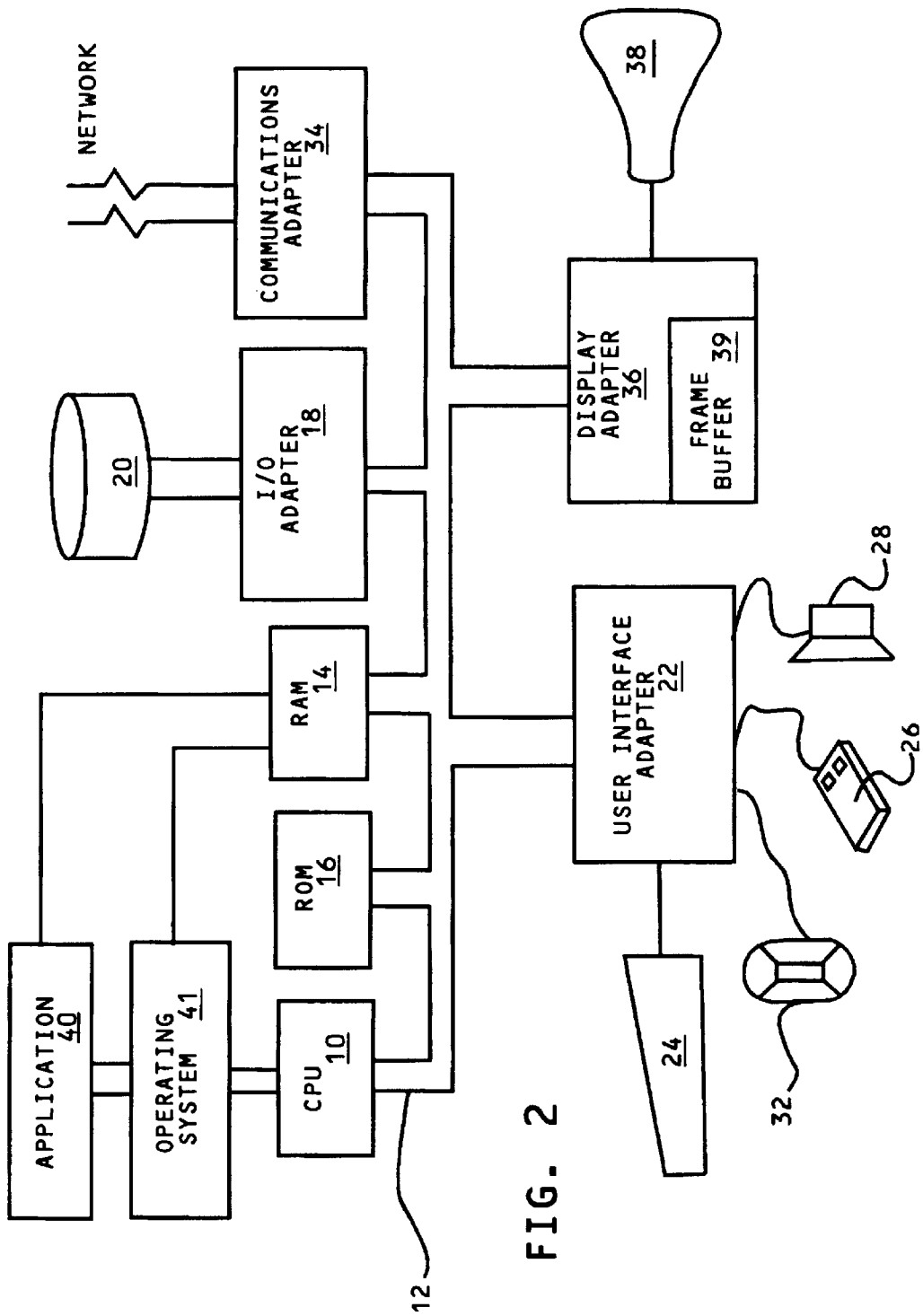
FIG. 2 is a block diagram of an interactive data processor controlled workstation display system including a central processing unit which is capable of serving as the primary server through which the seller may track the allocation of components in the network of FIG. 1.

FIG. 2 is a diagram of a display interface workstation which can function as the seller's primary server terminal 50, 51. It will be understood that similar workstations may function as any of the purchasers' display terminals 53 through 55. A central processing unit (CPU), such as in one of the PC Server series of workstations available from International Business Machines Corporation (IBM), or the Poweredge 2200 ("Poweredge 2200" is a trademark of Dell Corporation) server from Dell Corporation, is provided and interconnected to various other components by system bus 12. An operating system 41 runs on CPU 10 and provides control and is used to coordinate the function of the various components of FIG. 2. Operating system 41 may be one of the commercially available operating systems such as Microsoft's Windows NT™, IBM's NetView™ or Novell's NetWare™. UNIX or AIX Network operating systems may also be used. The programming applications for controlling all of the entries and consequent allocations and for tracking the computer components to be subsequently described for FIGS. 3 through 10, which are functions within the system solution application objects 43, 44 and 45 for the purchasers, the seller's business rules object 46, as well as the system solutions/business rules reconciling application object 47, are all represented by application 40, which runs in conjunction with operating system 41 and provides output calls to the operating system 41, which implements the various functions to be performed by the application 40. A read only memory (ROM) 16 is connected to CPU 10 via bus 12 and includes the basic input/output system (BIOS) that controls the basic computer functions. Random access memory (RAM) 14, which will provide for a portion of the basic storage of entries, as well as for part of the storage of data as to allocated computer components to be subsequently described; I/O adapter 18 and communications adapter 34 are also interconnected to system bus 12. It should be noted that software components, including the operating system 41 and the application 40, are loaded into RAM 14, which is the computer system's main memory. I/O adapter 18 conventionally communicates with the disk storage device 20, i.e. a hard drive which may also be involved in the subsequently described storage. Communications adapter 34 interconnects bus 12 with the rest of the network described in FIG. 1 enabling the data processing system to communicate with the other purchasers' display computers to control entry configurations and allocations to be subsequently described. Communications adapter 34 could also function to connect server 50 to a network, such as the Internet, over which additional allocated software computer components may be received if needed.

I/o devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the present invention may be implemented. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described with respect to the display screens of FIGS. 3 through 10, some simple illustrations of how the data entries are made through which computer components are allocated and tracked so that the resulting data may be used by the system solutions objects, the seller's business rules object, as well as the reconciling object. When the screen images are described, it will be understood that these may be rendered by storing an image and text creation programs, such as those in any conventional window operating system in the RAM 14 of the system of FIG. 2. The operating system is diagrammatically shown in FIG. 2 as operating system 41. Display screen images are presented to the viewer on display monitor 38 of FIG. 2. In accordance with conventional techniques, the user, i.e. the purchaser making entries through terminals 53 through 55 may control the screen interactively through a conventional I/O device, such as mouse 26 of FIG. 2, which operates through user interface 22 to call upon programs in RAM 14 cooperating with the operating system 41 to create the images in frame buffer 39 of display adapter 36 to control the display on monitor 38.

Now, with respect to FIGS. 3 through 7, we will illustrate some of the typical data entries used in the process of the above-mentioned application Ser. No. 09/159,954, now U.S. Pat. No. 6,336,101, as well as in another related application Ser. No. 09/118,208, now U.S. Pat. No. 6,243,745 Configuring Computer Network Operations Based Upon the Correlation of a Sequence of Interactive Display User Entries Apparently Unrelated to Computer Operations, filed on Jul. 17, 1998. The data is solicited from users so that computer components may be allocated among the purchasers in the network. With respect to FIGS. 8 through 10, we will illustrate some entries used in the process of another application Ser. No. 09/078,934, now U.S. Pat. No. 6,052,719 filed May 14, 1998, A Stored File of Recorded Keystrokes and Cursor Selections for Controlling Automatic Installation and Configuration of Programs and Components in a Network of Server and Client Computers, to Benzanson, Chuanq and Rodriguez. Please note with respect to FIG. 1 the data entry panels shown in FIGS. 3 through 10 may be interactively shown to purchasers on any of the displays of stations 53 through 55.

Figure 3:
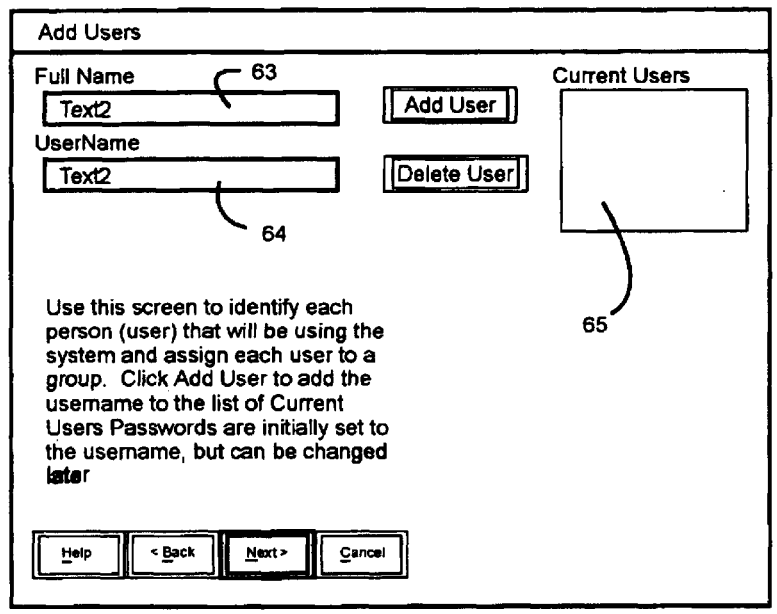
Figure 4:
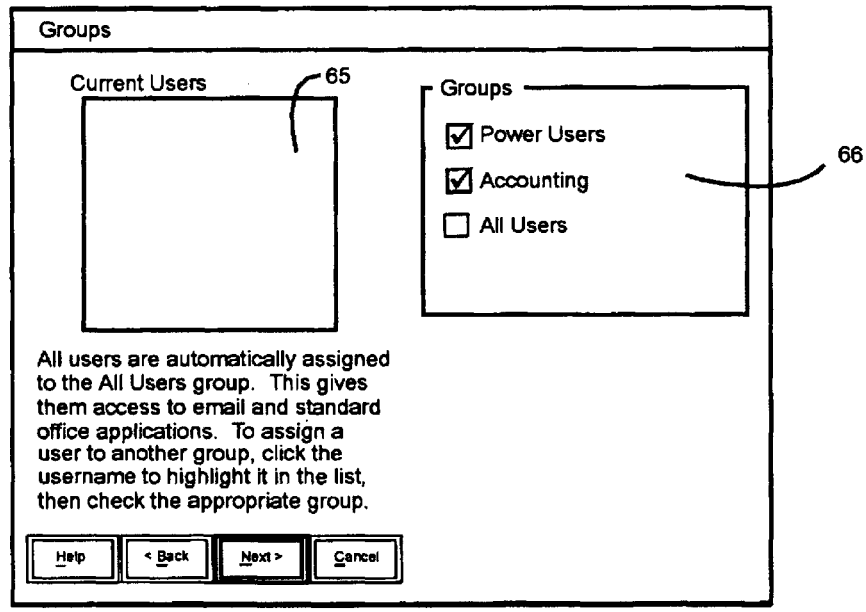
Figure 5:
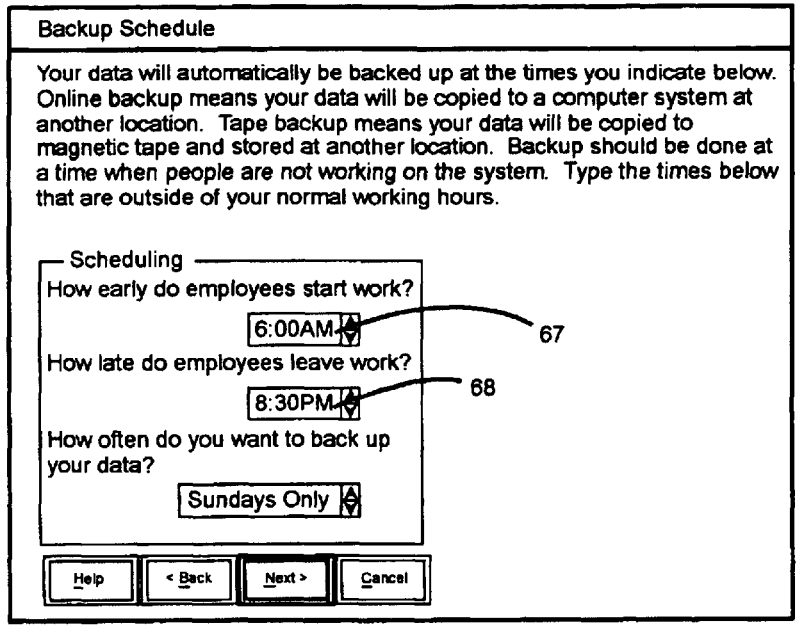

FIG. 3 shows a display panel through which the current users 65 may be organized in the purchaser's organization, and new users may be entered through data entry fields 63 and 64. FIG. 4 is a display panel through which the users 65 may be assigned to functional groups 66 so that this information may be used to allocate program resources. Next, the user may be prompted with a panel, FIG. 5, which will be used to allocate system backup. It prompts for employee start/leave information via data entry fields 67 and 68 so that this information may be used to set likely computer quiescent periods for backing up stored computer data. Such quiescent periods may also be used for other off use functions such as defragmentation of files stored on disk drives, the general cleaning up of files and other housekeeping functions, such as the running of antivirus routines.

Figure 6:
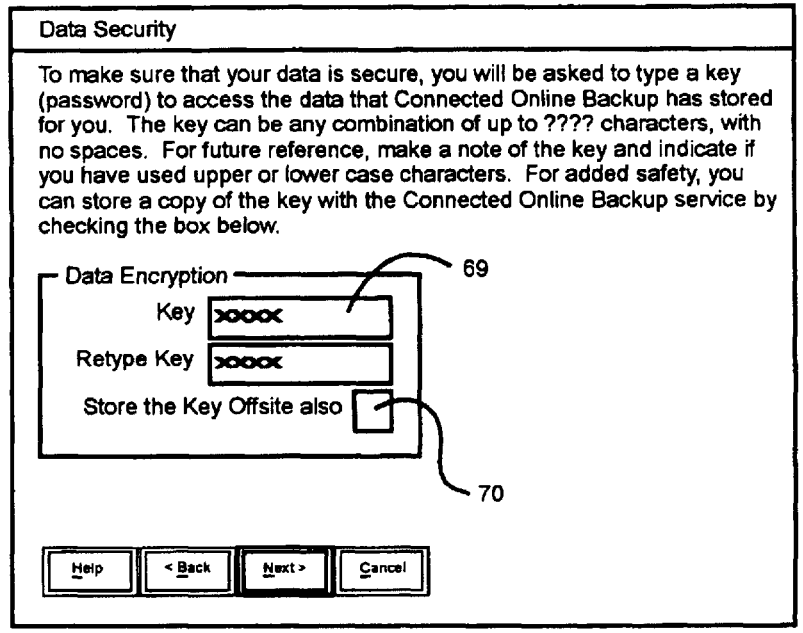

The user may also be presented with a data security display panel; FIG. 6, in which data encryption key entries 69 and 70 are prompted for. In the data entry panel of FIG. 7, group and job function information entries 71 and 72 are prompted for, which will be used to allocate programs for the particular user. Also, the employee's computer hours are solicited 73 and, particularly, graphic hours 74 are important since the system may use this information in an algorithm for setting aside storage space to store and support the user's activities.

Figure 8:
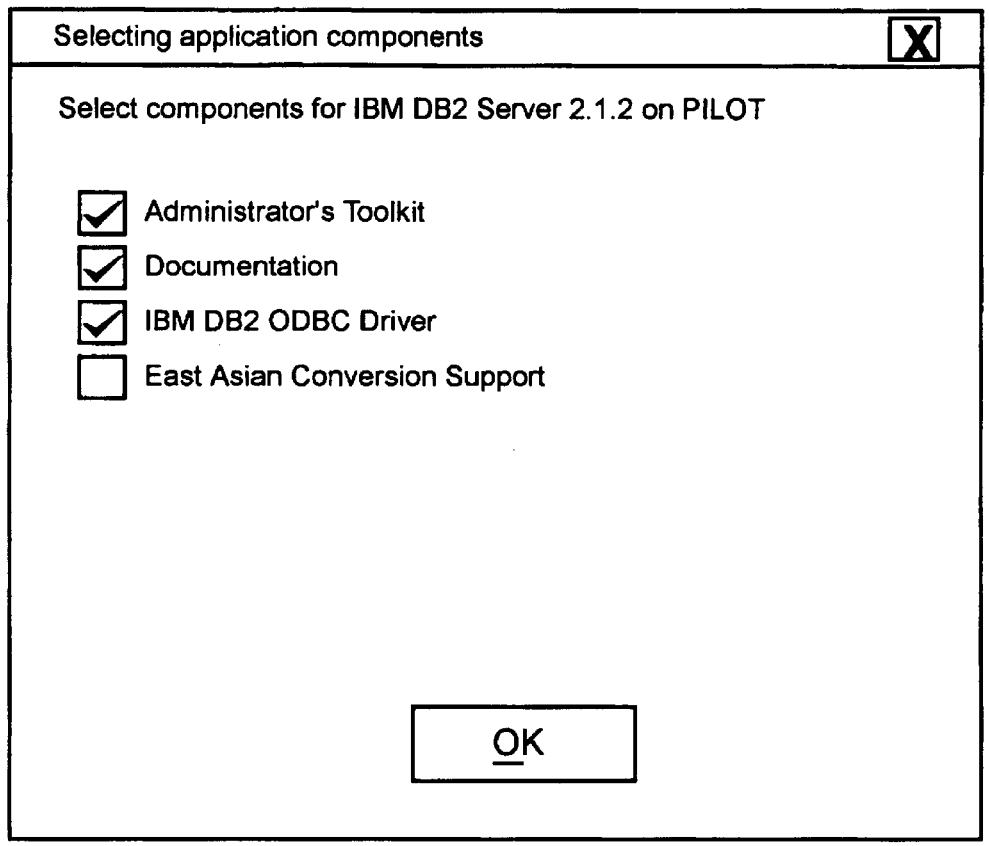
Figure 9:
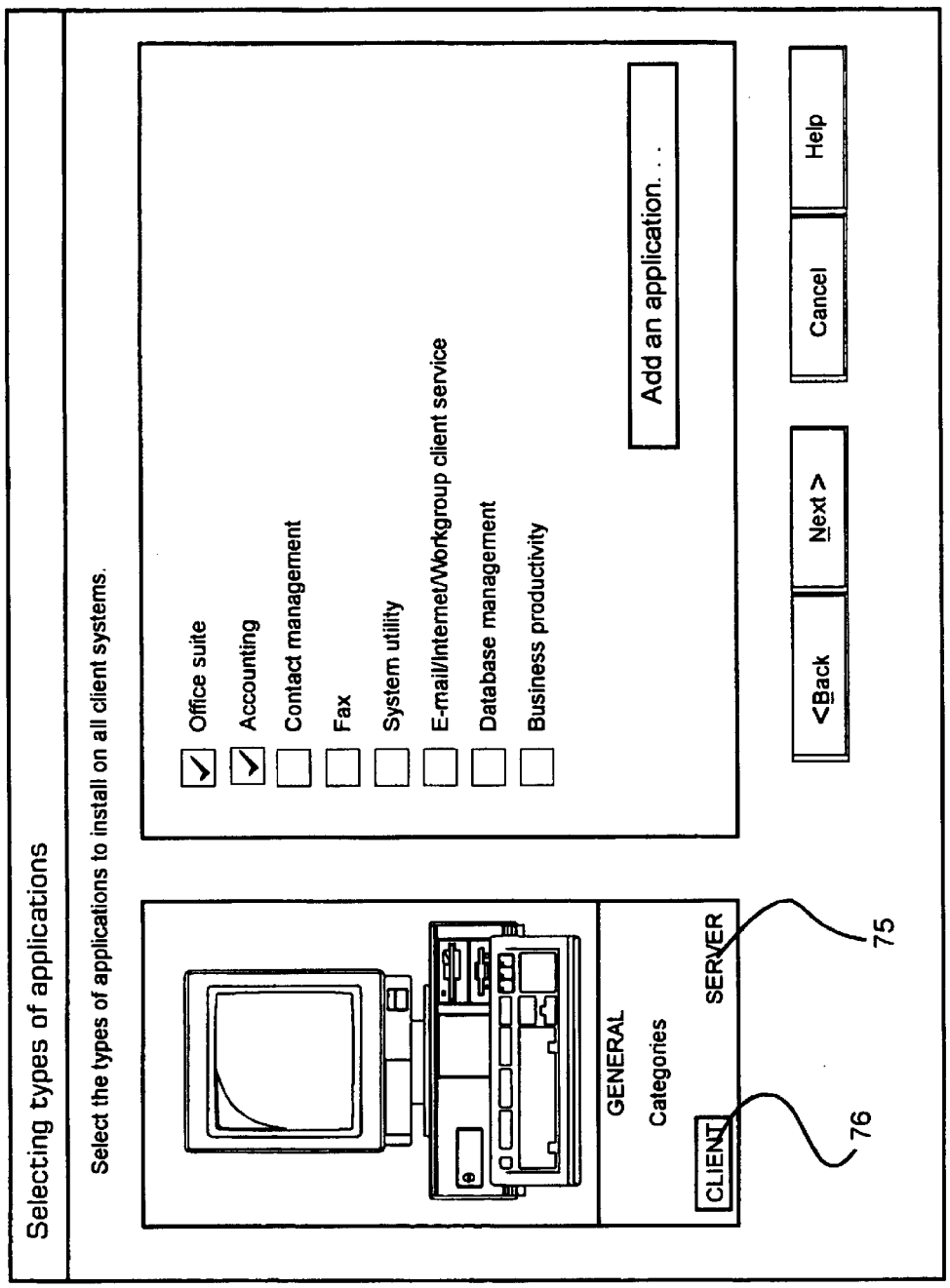
Figure 10:
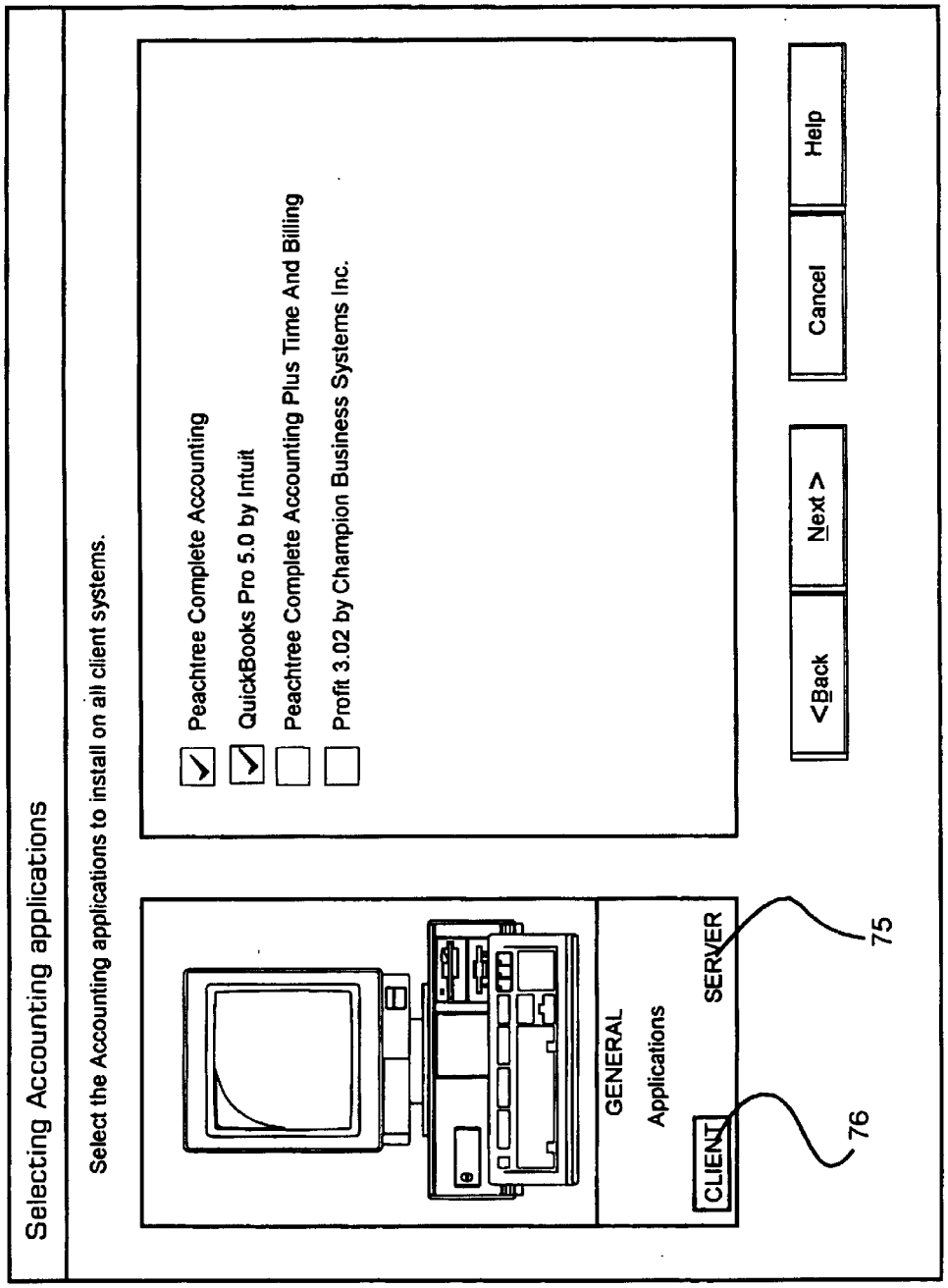

It should be noted that these data entry prompt panels are only a small group of potential data entry screens which may be used to get user data entries from which computer components to be allocated may be determined. For example, FIGS. 8 through 10 illustrate how the present invention may operate using the data entries in the system described in the above-mentioned application Ser. No. 09/078,934, now U.S. Pat. No. 6,052,719. FIG. 8 is a data entry panel prompting for database application components and drivers' selections for the server computer. Next, the screen of FIG. 9, applications to be installed on client (purchaser) computers are selected and more such selections for client (purchaser) computers are made through the screen of FIG. 10. Note that these selections are being made for clients is indicated by the activation of client button 76 rather than server button 75.

Figure 11A:
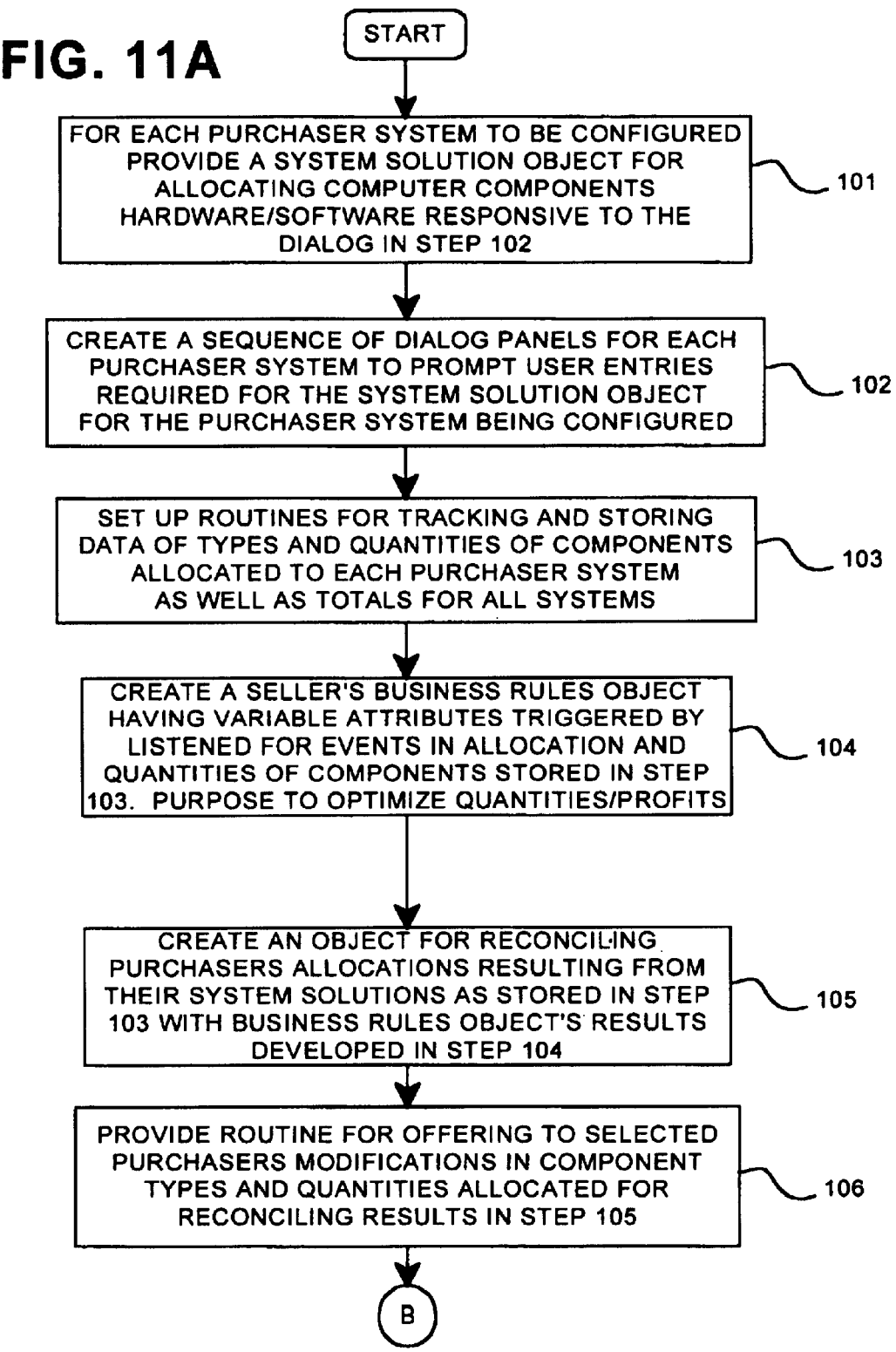
FIGS. 11A and 11B are a flowchart of the basic elements of the process program carried out by the computers in the current system enabling the system to control the data entry and system configuration including the allocation and tracking of computer components used for each purchaser and for reconciling such allocations with the seller's business rules for optimizing the sellers profits.
Figure 11B:
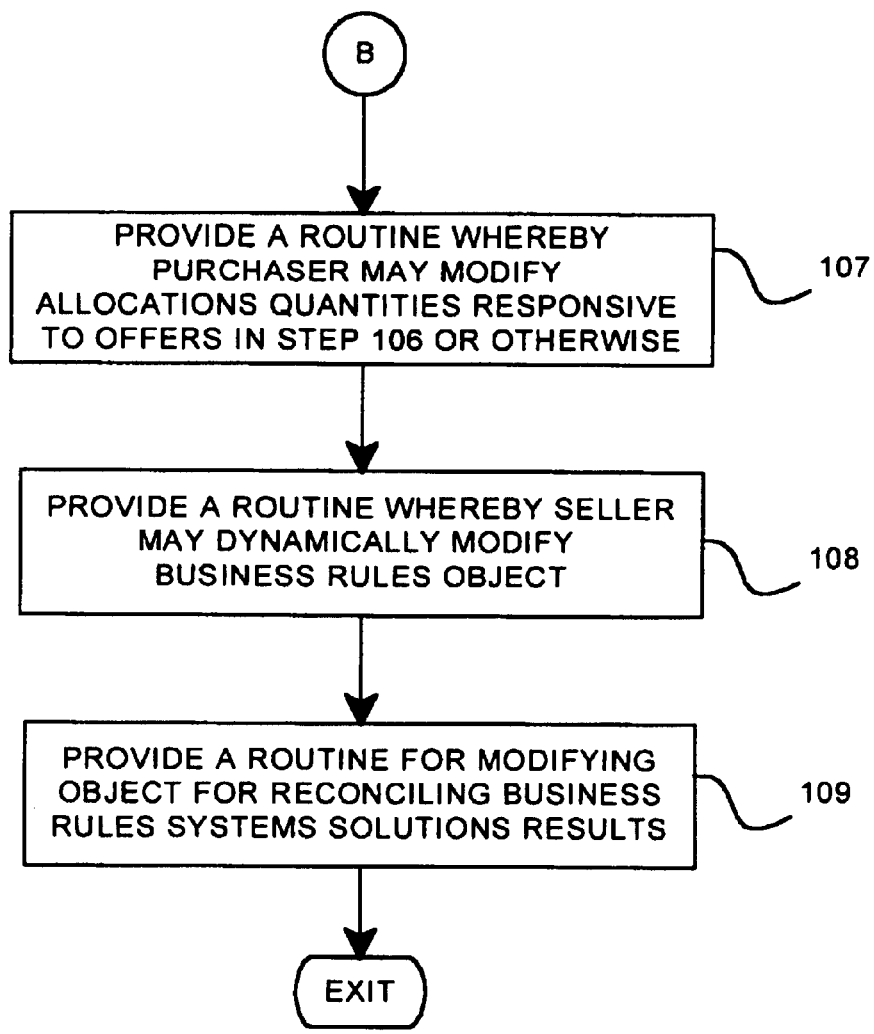

Now, with respect to FIGS. 11A and 11B, there will be generally described the basic elements of the programs which carry out the process of the present invention. Only for purposes of illustration, the present invention will use portions of the embodiments of the above-mentioned application Ser. No. 08/159,954 now U.S. Pat. No. 6,336,101 and Ser. No. 09/118,208 now U.S. Pat. No. 6,243,745. The programs of the present invention will be assumed to be in the reseller's server computer 50, which will enable the server to control the data entry and allocation operations described with respect to FIGS. 3 through 10. Step 101, there is set up for each purchaser system to be configured at terminal 53 through 55, FIG. 1, a system solution object, 43 through 45, FIG. 1, for allocating computer responsive to the sequence of dialog panels, step 102, prompting entries needed for the system solution object associated with the purchaser terminal. Next, program routines are set up for tracking the allocated types and quantities of components and for storing the tracked data, step 103. Then, step 104, a seller's business rules object is set up which has variable attributes triggered by listened for events in the allocations and quantities of components stored in step 103 toward the overall goal of optimizing component quantities/seller's profits. Then there is created an object interfacing with and compatible with the systems solutions objects for each purchaser and the seller's business rules object's results, and trying to reconcile differences between such objects, step 105. Then, step 106, routines are provided for offering to selected purchasers modifications in selected allocated component quantities in an attempt to fulfill the reconciliation offered in step 105. In carrying out this step, the seller may be notified about an offered solution and given the opportunity of communicating with a selected purchaser, or the system may automatically advise the purchaser of the offer. Accordingly, step 107, a routine is provided whereby the selected purchaser may modify quantities of components offered to him in response to step 106. Also, routines are provided, steps 108 and 109, through which the seller may respectively dynamically modify the business rules object or the object for reconciling the business rule/system solutions results.

Figure 12:
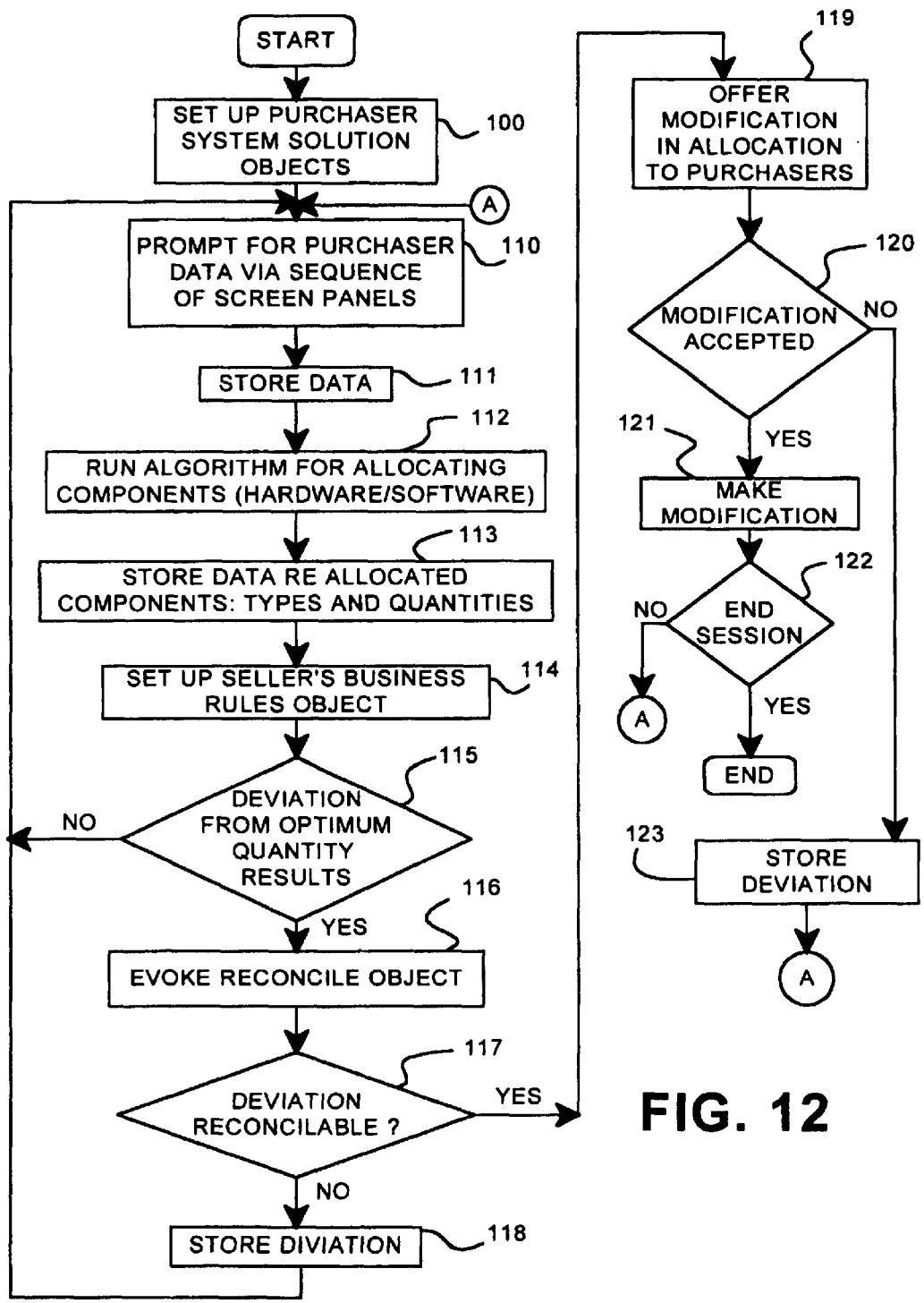
FIG. 12 is a flowchart of a simplified run illustrating the process of FIGS. 11A and B.

Now, with respect to FIG. 12, there will be described a modified program run to illustrate many of the steps involved in the prompts, data entries and storage of the entries described above for FIGS. 3 through 10, as well as the allocation, tracking and the seller's business rules application and potential reconciliation with the system solution component allocations for each purchaser. First, step 100, a system solution object is set up for each of the purchasers for whom computer systems are being configured. Then, step 110, the input data, like that of FIGS. 3 through 10, is prompted for from each purchaser. The data obtained is stored, step 111. The appropriate algorithms from the system solution objects for allocating hardware and software components are run, step 112, after which the data on allocated components, both hardware and software: types and quantities are tracked and stored, step 113, and accumulated and stored for the seller. The seller sets up his appropriate business rules object, step 114, deviations from the seller's optimum quantity/profitability results are determined in step 115. If there are No deviations, the process is returned to step 110 and the process continues its run. If the decision is Yes, there are such deviations, then the reconciling object 47 is evoked. The reconciling object tries to reconcile the deviations, decision step 117. If No, the deviation cannot be reconciled, then the deviation is noted and stored, step 118, and the process is returned to step 110 from which the process continues its run. If the decision from step 117 is Yes, the deviation is reconcilable, then, step 119, an appropriate offer is made to one or more of the purchasers as determined through the reconciling object 47. If in decision step 120, the offer is accepted, the modification is made, step 121. At this, or any appropriate point in the process, a determination will be made as to whether the session is over, decision step 122. If yes, then the session is ended. If No, then the process is returned to step 110 via branch "A". If back at decision step 120, the decision is No, the modification is not accepted, the deviation is noted and stored and the process is returned to step 110 also via branch "A". It should be noted that with respect to deviations stored in steps 117 and 123, that while a reconciliation may not be available at these points, the process will continue and the allocated component types and quantities may change to the point that the stored deviations may form a portion of an acceptable solution.

The described implementation of the present invention is as an application program made up of programming steps or instructions. Such a program 40 would be resident in RAM 14 of the server, FIG. 1, during computer operations. Until required by the computer system, the program instructions may be stored in another readable medium, e.g in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in a variety of computer readable media forms.

Although certain preferred embodiments have been shown and described, it will be understood that many changes and modifications may be made therein without departing from the scope and intent of the appended claims.

What is claimed is:

1. A user interactive display computer system provided by a seller of computer components to purchasers of computer systems, for configuring computer systems including said computer components comprising:

means for prompting each of a plurality of said system purchasers to make a sequence of interactive data entries, each of said entries relative to the data processing needs of the purchaser of one of said computer systems;

means for applying a set of purchaser business rules to the data entries of each of said purchasers to produce a system needs solution for each of said purchasers;

means for allocating said computer components to the computer system of each purchaser based upon said system needs solution for the purchaser;

means for tracking the quantities of each of said computer components thereby allocated to computer systems sold by said seller to all of said purchasers;

means for applying a set of seller business rules to the tracked quantities of each of said computer components to produce a set of optimized quantities for each of said computer components based on the seller's business needs;

means for providing a set of business rules for reconciling said purchasers' system needs solution with said optimized quantities; and means for automatically offering, to selected ones of said purchasers financial incentives based upon said business rules for reconciling to thereby reconcile said purchasers' system needs solutions with said optimized quantities of said component based upon the seller's business needs.

2. The user interactive computer display system of claim 1 wherein said means for offering to purchasers modifications in quantities of selected allocated components includes means for enabling the seller to offer to said purchasers financial incentives for accepting said modifications.

3. The user interactive computer display system of claim 1 further including means for dynamically modifying said set of seller business rules.

4. The user interactive computer display system of claim 1 further including means for dynamically modifying said set of business rules for reconciling.

5. The user interactive computer display system of claim 1 wherein said computer systems being configured are network systems.

6. In a user interactive display computer process, provided by a seller of computer components to purchasers of computer systems, for configuring computer systems including said computer components, steps comprising:

prompting each of a plurality of said system purchasers to make a sequence of interactive data entries, each of said entries relative to the data processing needs of the purchaser of one of said computer systems;

applying a set of purchaser business rules to the data entries of each of said purchasers to produce a system needs solution for each of said purchasers;

allocating said computer components to the computer system of each purchaser based upon said system needs solution for the purchaser;

tracking the quantities of each of said computer components thereby allocated to computer systems sold by said seller to all of said purchasers;

applying a set of seller business rules to the tracked quantities of each of said computer components to produce a set of optimized quantities for each of said computer components based on the seller's business needs; and providing a set of business rules for reconciling said purchasers' system needs solution with said optimized quantities; and automatically offering, to selected ones of said purchasers, financial incentives based upon said business rules for reconciling to thereby reconcile said purchasers' system needs solutions with said optimized quantities of said components based upon the sellers' business needs.

7. The process of claim 6 wherein said step of offering to purchasers modifications in quantities of selected allocated components is carried out by first enabling the seller to offer to said purchasers financial incentives for accepting said modifications.

8. The process of claim 6 wherein said set of seller business rules may be dynamically modified.

9. The process of claim 6 wherein said set of business rules for reconciling may be dynamically modified.

10. The process of claim 6 wherein said computer systems being configured are network systems.

11. A computer program included on a computer readable medium operable in a user interactive display computer system provided by a seller of computer components to purchasers of computer systems, for configuring computer systems including said computer components comprising:

means for prompting each of a plurality of said system purchasers to make a sequence of interactive data entries, each of said entries relative to the data processing needs of the purchaser of one of said computer systems;

means for applying a set of purchaser business rules to the data entries of each of said purchasers to produce a system needs solution for each of said purchasers;

means for allocating said computer components to the computer system of each purchaser based upon said system needs solution for the purchaser;

means for tracking the quantities of each of said computer components thereby allocated to computer systems sold by said seller to all of said purchasers;

means for applying a set of seller business rules to the tracked quantities of each of said computer components to produce a set of optimized quantities for each of said computer components based on the seller's business needs; and means for providing a set of business rules for reconciling said purchasers' system needs solution with said optimized quantities; and means for automatically offering, to selected ones of said purchasers financial incentives based upon said business rules for reconciling to thereby reconcile said purchasers' system needs solutions with said optimized quantities of said component based upon the seller's business needs.

12. The computer program of claim 11 wherein said means for offering to purchasers modifications in quantities of selected allocated components includes means for enabling the seller to offer to said purchasers financial incentives for accepting said modifications.

13. The computer program of claim 11 further including means for dynamically modifying said set of seller business rules.

14. The computer program of claim 11 further including means for dynamically modifying said set of business rules for reconciling.

15. The computer program of claim 11 wherein said computer systems being configured are network systems.

* * * * *

UNITED STATES PATENT AND TRADEMARK OFFICE
CERTIFICATE OF CORRECTION

| | | |
|---|---|---|
| PATENT NO. | : 7,006,985 B1 | Page 1 of 1 |
| APPLICATION NO. | : 09/282615 | |
| DATED | : February 28, 2006 | |
| INVENTOR(S) | : Jeffrey Randell Dean et al. | |

It is certified that error appears in the above-identified patent and that said Letters Patent is hereby corrected as shown below:

Column 1, line 12: after "following" please insert --copending--;

Column 6, line 50: delete ".";

Column 8, line 54: delete "," and insert --;--.

Signed and Sealed this

Fifteenth Day of August, 2006

JON W. DUDAS
*Director of the United States Patent and Trademark Office*